United States Patent [19]
Nagano et al.

[11] Patent Number: 6,160,636
[45] Date of Patent: *Dec. 12, 2000

[54] IMAGE READING APPARATUS

[75] Inventors: Fumikazu Nagano; Mitsugi Yasuhara; Akihiro Tanaka, all of Yamatokoriyama, Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/006,268

[22] Filed: Jan. 13, 1998

[30] Foreign Application Priority Data

Jan. 20, 1997 [JP] Japan .................................. 9-007232

[51] Int. Cl.$^7$ ...................................................... H04N 1/36
[52] U.S. Cl. ............................ 358/412; 358/404; 358/444; 358/474
[58] Field of Search .................................. 358/404, 444, 358/412, 483, 523, 593, 471, 474; 382/312, 313

[56] References Cited

U.S. PATENT DOCUMENTS

| | | | |
|---|---|---|---|
| 4,160,279 | 7/1979 | Fuwa | 358/486 |
| 4,712,139 | 12/1987 | Kato | 358/404 |
| 4,748,514 | 5/1988 | Bell | 358/486 |
| 5,446,554 | 8/1995 | Ono | 358/404 |
| 5,508,820 | 4/1996 | Kabeya | 358/404 |
| 5,517,331 | 5/1996 | Murai et al. | 358/412 |
| 5,648,800 | 7/1997 | Takeda | 358/296 |
| 5,825,512 | 10/1998 | Okita | 358/404 |

FOREIGN PATENT DOCUMENTS 7-264358  10/1995  Japan .

OTHER PUBLICATIONS

European Search Report—EP 97 12 0845—Jan. 12, 2000.

*Primary Examiner*—Cheukfan Lee
*Attorney, Agent, or Firm*—Dike, Bronstein, Roberts & Cushman, LLP; David G. Conlin; David A. Tucker

[57] ABSTRACT

An original is moved by a feed motor so as to read the original by the combination of a light source and a CCD. The image information thus read is stored into the memory. The image information stored in the memory is sent out via a modem to the phone line. The amount of data stored in the memory is detected: if the amount of data exceeds the first predetermined amount, the speed of movement of the original is gradually reduced while if the amount of data becomes equal to or smaller than a second predetermined amount which is smaller than the first predetermined amount, the speed of movement of the original is gradually raised.

4 Claims, 6 Drawing Sheets

IMAGE READING APPARATUS

BACKGROUND OF THE INVENTION (1) Field of the Invention

The present invention relates to an image reading apparatus for reading original documents, which is applied to facsimile machines, copiers, scanners, printers etc.

(2) Description of the Prior Art

In conventional image reading apparatus for reading original documents for facsimile machines etc., an original is read using CCD image sensors or the like whilst it is being moved by a feed motor etc., and the thus picked up image information of the original is stored into the image memory incorporated in the facsimile machine. The stored image information will be sent out onto phone networks through a modem, if the machine is used as a facsimile.

Figure 1:
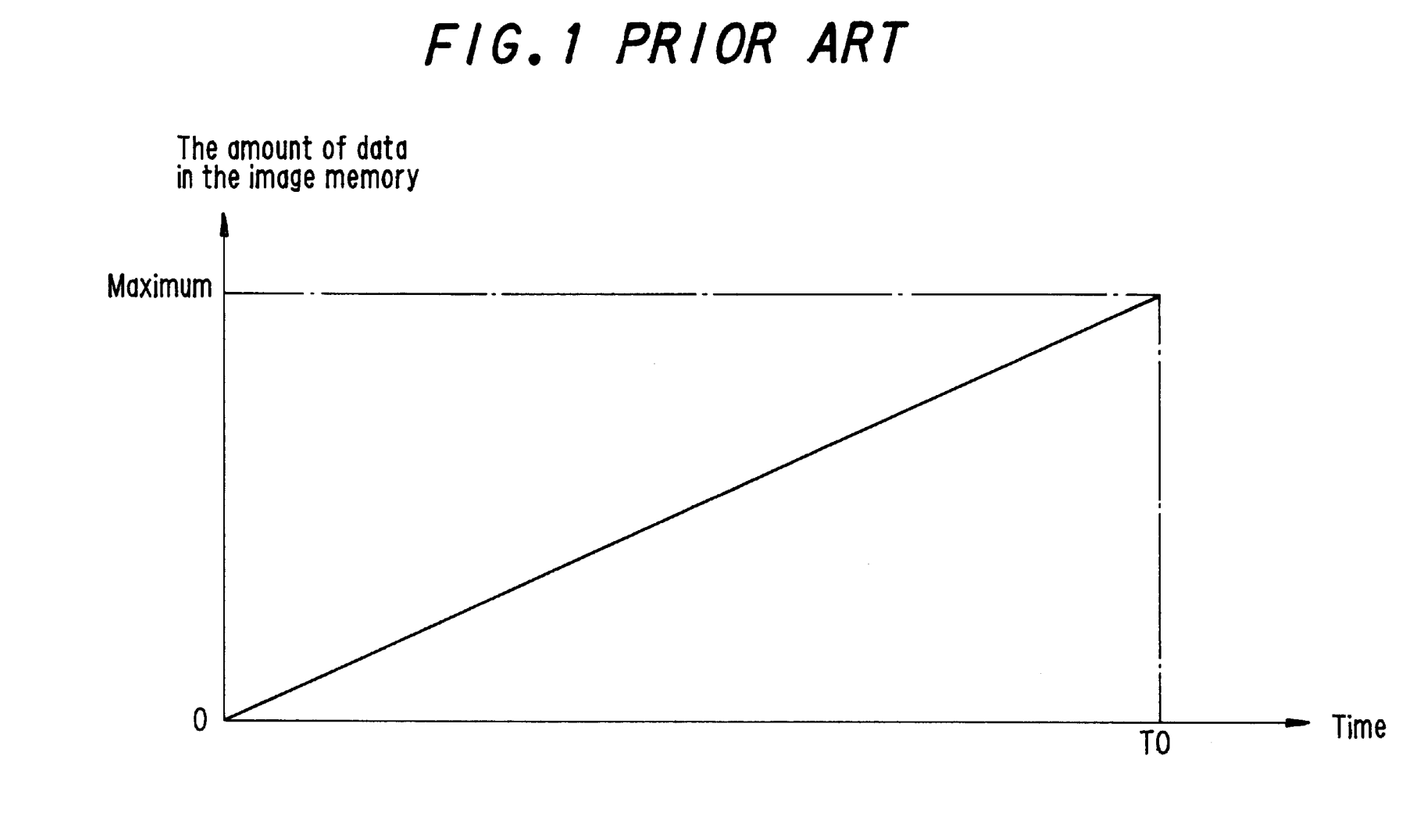
FIG. 1 is a chart showing the change of the amount of data in the conventional image memory.

The transmission rate of the image information sent out onto the phone network varies depending upon the capacity of the opposite facsimile machine or the status of the phone network. For example, in some cases such as when a large quantity of original documents need to be picked up, or when the transmission rate to the network is slower than the speed of reading original, the amount of data in the image memory may become its maximum. FIG. 1 shows the change in the amount of data in the image memory depending upon time. In this figure, the data in the image memory has become its maximum at time T0.

If the amount of data in the image memory reaches its maximum, no more data can be stored therein. Therefore, the operation of original reading must be stopped temporarily. The operation of reading the original will be restarted only after some image information has been sent out onto the phone network and thereby some empty areas have been secured inside the image memory.

However, if the operation of original reading is halted, the feed motor for conveying the original must be stopped. If this stoppage is done abruptly, the quality of the image may be degraded: the CCD image sensor picks up the same area repeatedly, whereby the printout on the receiver side facsimile machine will have a transverse line etc., which bears no relation to the original content. Further, there occurs a case in which if the feed motor is stopped abruptly, the motor cannot stop instantly but continues to rotate to some degree until it stops completely. This transient phenomenon may degrade positional accuracy of reading with respect to the original's direction of movement.

These drawbacks can be eliminated if a high capacity image memory is used in order not to disrupt the operation of original reading. But, a high capacity memory costs more.

The above problems also occur in other types of facsimile machines having a compressing function, or in scanners for transmitting the scanned image information to the host computer. Illustratively, in a facsimile machine having a compressing function, the picked up image information is sent to its compressing circuit through a buffer memory. In this case, if the speed of compression of the image information is lower than that of reading the original, the amount of data in the buffer memory may become its maximum in some cases. Therefore, the feed motor must be stopped abruptly in order to temporarily disrupt the operation of reading the original.

Further, in a scanner, when the image information scanned is sent to the host computer, the image information will be stored into the image memory in a similar manner to the facsimile machine. Also in this case, if the transmission rate of the image information to the host computer is lower than that of scanning the original, the amount of data in the image memory reaches its maximum, thus giving rise to a similar problem.

An image reading apparatus for dealing with these problems has been disclosed in Japanese Patent Application Laid-Open Hei 7 No. 264,358. In accordance with the image reading apparatus defined in this disclosure, when the original reading is disrupted, the feed motor is stopped abruptly, and the feed motor is reversed so that the correct position of reading is restored, taking into consideration the transient movement of the feed motor, thereafter original reading is restarted. Accordingly, it is possible to avoid the problem originating from the transient movement occurring when the feed motor is stopped, however the feed motor must be reversed so that it needs additional wasted time for reading the original.

SUMMARY OF THE INVENTION

In view of the above problems, it is therefore an object of the present invention to provide an image reading apparatus which can effectively use the memory capacity without degrading the quality of image.

To achieve the above object, the present invention is featured as follows:

In accordance with the first aspect of the invention, an image reading apparatus comprises: a converting means for reading the information of an original and converting the read information into image information; a moving means for relatively moving the converting means to the original; a storage means for storing the image information; and a controlling means for controlling the relative movement of the original to the converting means in accordance with the amount of data stored in the storage means.

In accordance with the second aspect of the invention, the image reading apparatus having the above first feature is characterized in that the controlling means detects the amount of data stored in the storage means, and gradually reduces the speed of movement of the original or the converting means when the amount of data exceeds a first predetermined amount.

In accordance with the third aspect of the invention, the image reading apparatus having the above first feature is characterized in that the controlling means detects the amount of data stored in the storage means, and gradually reduces the speed of movement of the original or the converting means when the amount of data exceeds a first predetermined amount and gradually increases the speed of movement when the amount of data becomes equal to or smaller than a second predetermined amount which is smaller than the first predetermined amount.

In accordance with the fourth aspect of the invention, the image reading apparatus having the above second feature is characterized in that the controlling means stops the movement of the original or the converting means when the amount of data stored in the storage means reaches its maximum or immediately before reaching the maximum.

In accordance with the fifth aspect of the invention, the image reading apparatus having the above third feature is characterized in that the controlling means stops the movement of the original or the converting means when the amount of data stored in the storage means reaches its maximum or immediately before reaching the maximum.

In accordance with the sixth through tenth aspects of the invention, the image reading apparatus having the first through fifth feature is characterized in that the operation timing of the converting means is controlled in accordance with the speed of movement of the original and the converting means.

In the above configuration, the information of an original is read and converted into image information by the converting means and this is stored into the storage means. In accordance with the amount of data thus stored, the relative movement of the original to the converting means is controlled. This control may be performed by, for example, detecting the amount of data stored in the storage means so as to gradually lower the speed of movement of the original or the converting means if the amount of data exceeds the first predetermined amount. When the amount of data stored in the storage means has reached its maximum, or immediately before reaching the maximum, the movement of original or the converting means may be stopped. Further, when the amount of data becomes equal to or smaller than the second predetermined amount which is smaller than the first predetermined amount, the speed of movement may be gradually increased.

By these settings, since the speed of movement of the original or converting means is gradually varied unlike the conventional configuration in which the movement of the original is stopped abruptly when the reading of the original is temporarily disrupted, it is possible to read the original exactly, in particular, it is possible to read the original precisely in the direction of movement of the original. Further, for example, when the first predetermined amount is set at a value which is close to the maximum amount of data to be stored in the storing means and the second predetermined amount is set at a value which is close to the minimum amount of data to be stored in the storing means, it is possible to efficiently use the capacity of the information the storage means can store.

The relative movement of the original to the converting means includes the case where the original moves while the converting means is fixed and also the case where the converting means moves while the original is fixed.

It is also possible to control the operation timing of the converting means in accordance with the speed of movement of the original or the converting means. By this setting, since the converting means is operated in accordance with the change in the speed of movement of the original or the converting means, it is possible to avoid redundant reading or skips in reading.

DESCRIPTION OF THE PREFERRED EMBODIMENTS

The embodiment of the invention will hereinafter be described in detail with reference to the accompanying drawings.

(First embodiment)

Figure 2:
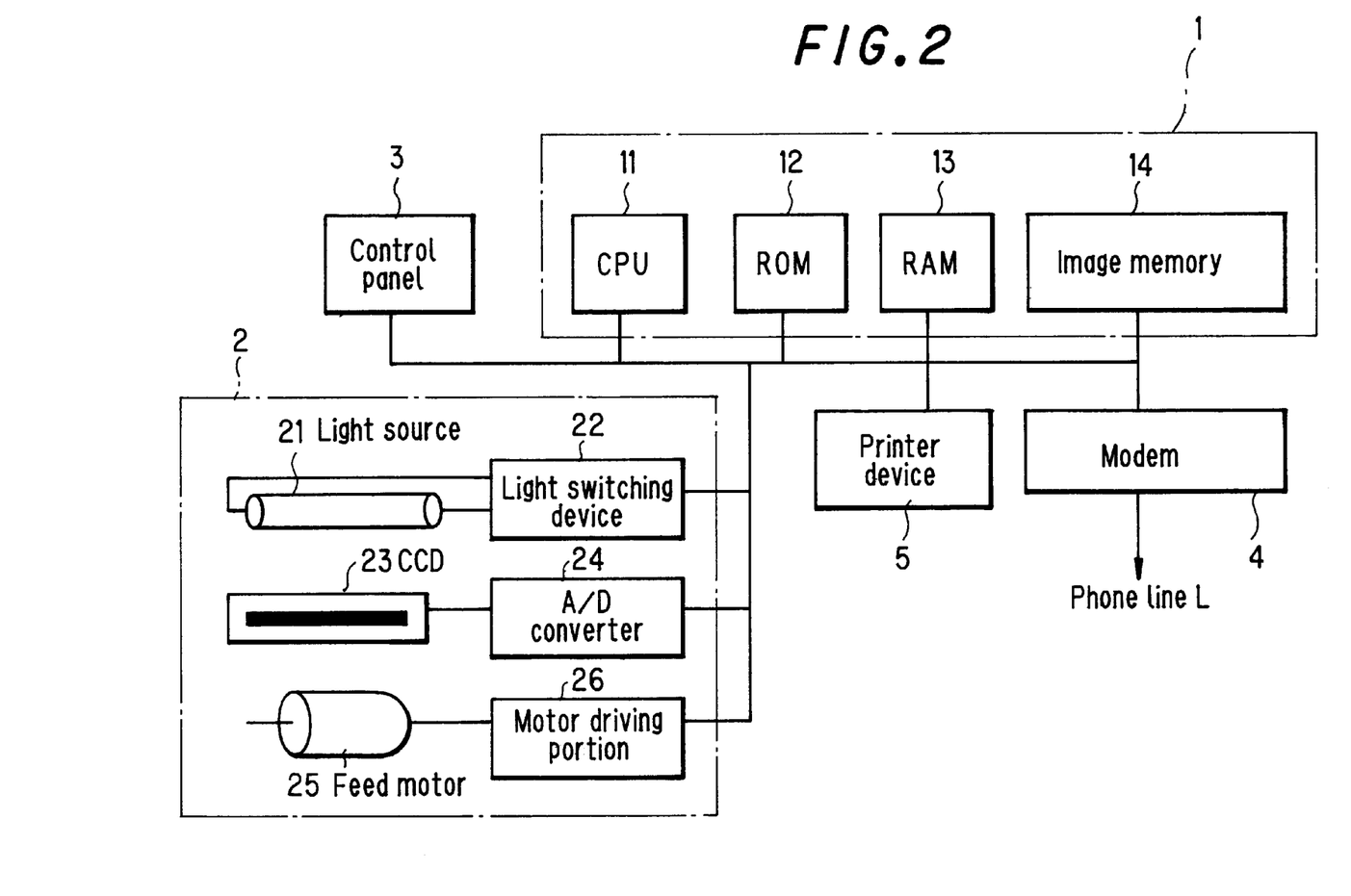
FIG. 2 is a block diagram showing the configuration of a facsimile machine to which the image reading apparatus is applied.

FIG. 2 is a block diagram showing the internal structure of a facsimile machine to which the image reading apparatus in accordance with the first embodiment of the invention is applied. This facsimile machine reads the image information written in an original, and the read image information is stored temporarily in the memory, and the image information is transmitted to another facsimile machine by way of the phone network.

This facsimile machine includes: a controller 1 having a microcomputer; a converting means for reading the image information written in the original; and an image reading portion 2 having a moving means. Controller 1 has a CPU 11 as a controlling means governing a variety of controls, a ROM 12 storing predetermined programs; a RAM 13 as a work area; and an image memory 14 (to be referred to simply as 'memory 14' hereinbelow) as a storage means constructed of DRAMs for storing the image information. These components are connected to one another by bus lines etc.

Image reading portion 2 includes: a light source 21 such as fluorescent lamp etc., a light switching device 22 for turning on light source 21; a CCD image sensor 23 (to be referred to simply as CCD 23 hereinbelow) for reading the original content; an A/D converter 24 for converting the analog information read by CCD 23 into digital information; an unillustrated feed roller for transporting the original; a feed motor 25 for driving the feed belt etc.; and a motor driving portion 26 for driving feed motor 25. The moving means is composed of a feed roller, a feed belt, feed motor 25 and motor driving portion 26. For example, a stepping motor is used in the moving means in order to synchronize its operation with the operation timing of light source 21 and CCD 23 and so as to change the speed of moving the original.

For the moving means, light source 21 and CCD 23 may be adapted to move instead of moving the original. That is, with the original fixed, light source 21 and CCD 23 may be moved so as to read the original information.

Connected to controller 1 are a control panel 3 through which the user sets the conditions of operation of the facsimile machine, a modem 4 for modulating and demodulating the image information to exchange data with phone network L, and a printer device 5 for printing the received image information.

In the above arrangement, an original being moved by feed motor 25 is read by the combination of light source 21 and CCD 23 which are controlled by CPU 11 at the predetermined control timing. The picked up image information is converted into digital information by A/D converter 24, and this is compressed by CPU 11 and then transferred to memory 14. The image information stored in memory 14 is output via modem 4 to phone network L. CPU 11 continuously detects the amount of data in memory 14, and sends out a control signal in accordance with the amount of data to motor driving portion 26, so that feed motor 25 will change the speed of movement of the original.

Figure 3:
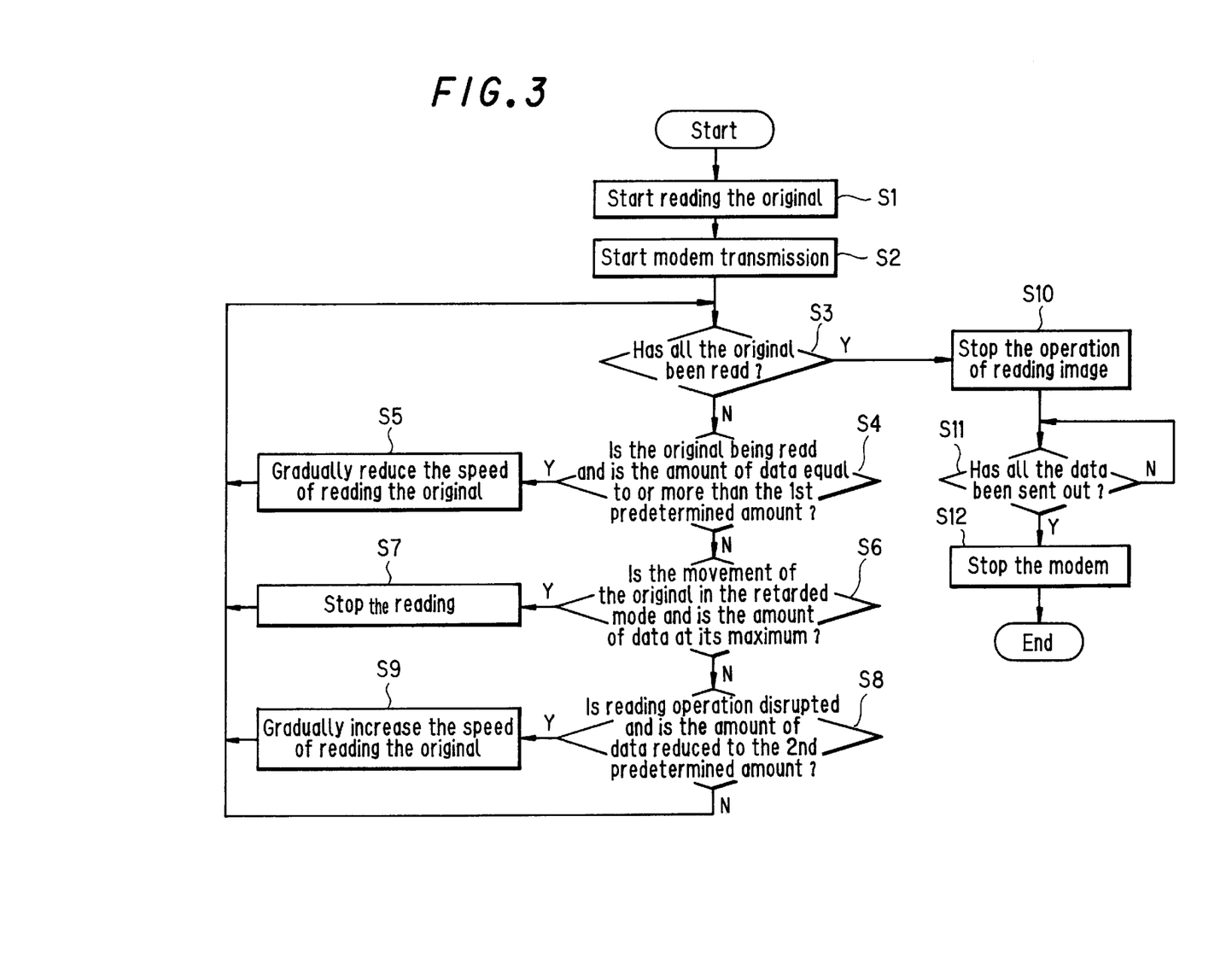
FIG. 3 is a flowchart showing the content of the controls in the image reading apparatus in accordance with the first embodiment of the invention.
Figure 4:
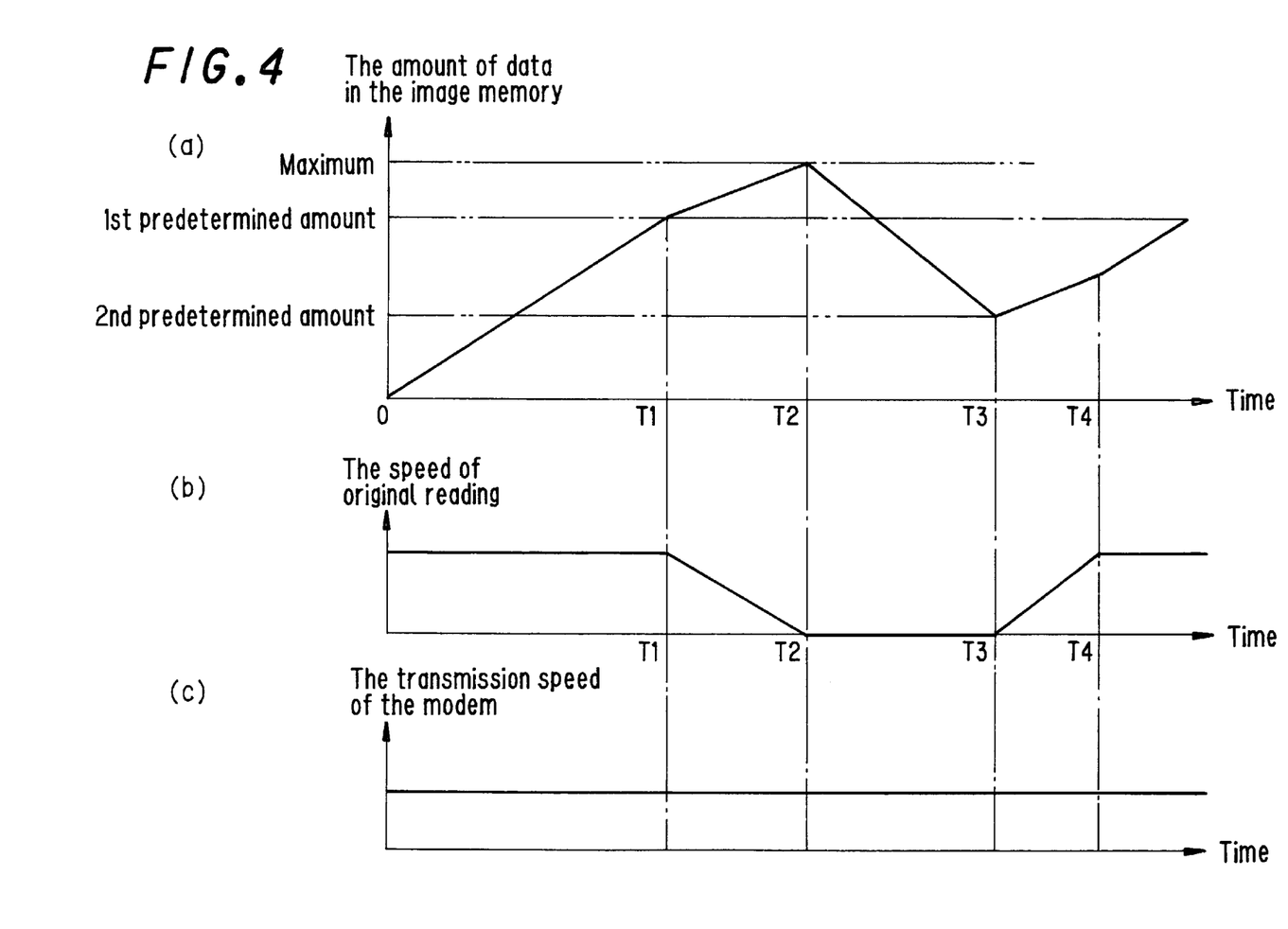
FIG. 4 is a chart showing the relationship between: the amount of data in the memory, the speed of reading the original, and the speed of the modem in transmitting the image information to the phone line, (a) a view showing the change of the amount of data in the image memory, (b) a view showing the change of the speed of reading the original and (c) a view showing the change of the speed of the modem in transmitting the image information to the phone line.

FIG. 3 is a flowchart showing the content of the controls executed by CPU 11. FIG. 4 is a chart showing the relationship between: the amount of data in memory 14, the speed of reading the original, and the speed of modem 4 in transmitting the image information to phone line L.

Referring to FIGS. 3 and 4, the control steps of CPU 11 will be described. When the user sets an original and designates a transmission through control panel 3, reading of the original is commenced by image reading portion 2 (Step 1). Illustratively, a control pulse imparted from CPU 11 activates feed motor 25, and light source 21 is turned on for a predetermined period of time in accordance with the control pulse. The reflected light from the original is detected by CCD 23 to thereby read the original.

The image information thus read and converted is stored in memory 14 and sequentially sent out to phone network L via modem 4 (Step S2). The transmission rate of the image information by modem 4 is constant as shown in chart(c) of FIG. 4. If this rate is slower than the speed of original reading by CCD 23, the image information gradually builds up in memory 14 (see chart(a) of FIG. 4).

Next, it is judged whether all the original has been read (Step S3). If negative, the operation goes to Step S4. At Step S4, it is checked whether the original is being read by image reading portion 2 and whether the amount of data in memory 14 is equal to or more than the first predetermined amount. The first predetermined amount is a previously set value which represents that the amount of data at which memory 14 is almost at its maximum.

When the amount of data in memory 14 has reached the first predetermined amount, CPU 11 sends a signal that instructs motor driving portion 26 to lower the rotational rate of feed motor 25 and hence the speed of movement of the original. In response to this control signal, the feed motor 25 gradually reduces its rotational rate and hence gradually lowers the speed of movement of the original (Step S5, see chart(b) of FIG. 4). In this way, the movement of the original will not be stopped abruptly as performed in the conventional art, so that CCD 23 will not read the same area redundantly, thus avoiding degradation of the quality of the original. Further, transient movement which would occur when feed motor 25 is stopped abruptly, will not occur, so the positional accuracy of reading with respect to the moving direction of the original can be more exact. Moreover, since it is no longer necessary to reverse the feed motor as done in the conventional configuration, no extra time is needed for reading the original.

Since the first predetermined amount is set close to a value at which the amount of data in memory 14 is at its maximum, and the speed of moving the original is lowered when the volume of data in the memory reaches the first predetermined amount, it is possible to efficiently use the storage capacity of memory 14 compared to the case where, for example, the first predetermined amount is half the storage capacity of memory 14. As a result, neither high capacity memory is needed nor any additional memory.

Further, since the transmission of the image information from modem 4 is continued even when the speed of reading the original is reduced, the amount of data in memory 14 will increase more gradually as compared to the case where the original is transported at the standard speed (see the section between T1 and T2 in chart(a) of FIG. 4).

Next, it is checked whether the movement of the original is in the retarded mode and whether the amount of data in memory 14 is at its maximum (Step S6). If the amount of data in memory 14 has reached its maximum, feed motor 25 is stopped to disrupt the reading operation (Step S7, see chart(b) of FIG. 4). Alternatively, it is also possible to stop feed motor 25 before the amount of data in memory 14 has become its maximum. Or, it is further possible to keep the original reading speed lower than the amount of data being sent out. Simply, any method is acceptable as long as the movement of the original will not be stopped abruptly.

Since modem 4 continues to send out the image information at a predetermined speed after feed motor 25 has stopped, the amount of data in memory 14 will be being reduced (see the section between T2 and T3 in chart(a) of FIG. 4).

Next, it is judged whether reading operation is disrupted and whether the amount of data in memory 14 is reduced to the second predetermined amount or less (Step S8). The second predetermined amount is a previously set value which represents that the amount of data in memory 14 is almost zero.

When the amount of data in memory 14 is reduced to the second predetermined amount or less, reading of the original is restarted and the speed of movement of the original is gradually accelerated (Step S9). In this case, the speed of movement of the original is not raised abruptly to the standard speed but is increased gradually, so that reading of the original will not be degraded.

The speed of movement of the original is gradually accelerated and becomes equal to the standard original reading speed after a predetermined time (see the graph after T4 in chart(b) of FIG. 4) and the amount of data in memory 14 will also increase. The amount of data in memory 14 has reached the first predetermined amount, the same control as stated above will be made again.

On the other hand, if it is judged at Step S3 that all the original has been read, the operation of reading the original is stopped (Step S10), and the data transmission via phone line L is continued until all the data in memory 14 is sent out (Step S11). Then when the transmission of data finishes, the operation of modem 4 is stopped (Step S12).

In this way, in accordance with this facsimile machine, since the speed of movement of the original or the converting means is gradually varied in accordance with the amount of data in memory 14, it is possible to eliminate the reading defects of the original which would occur when the movement of the original was stopped abruptly in the conventional art.

Figure 5:
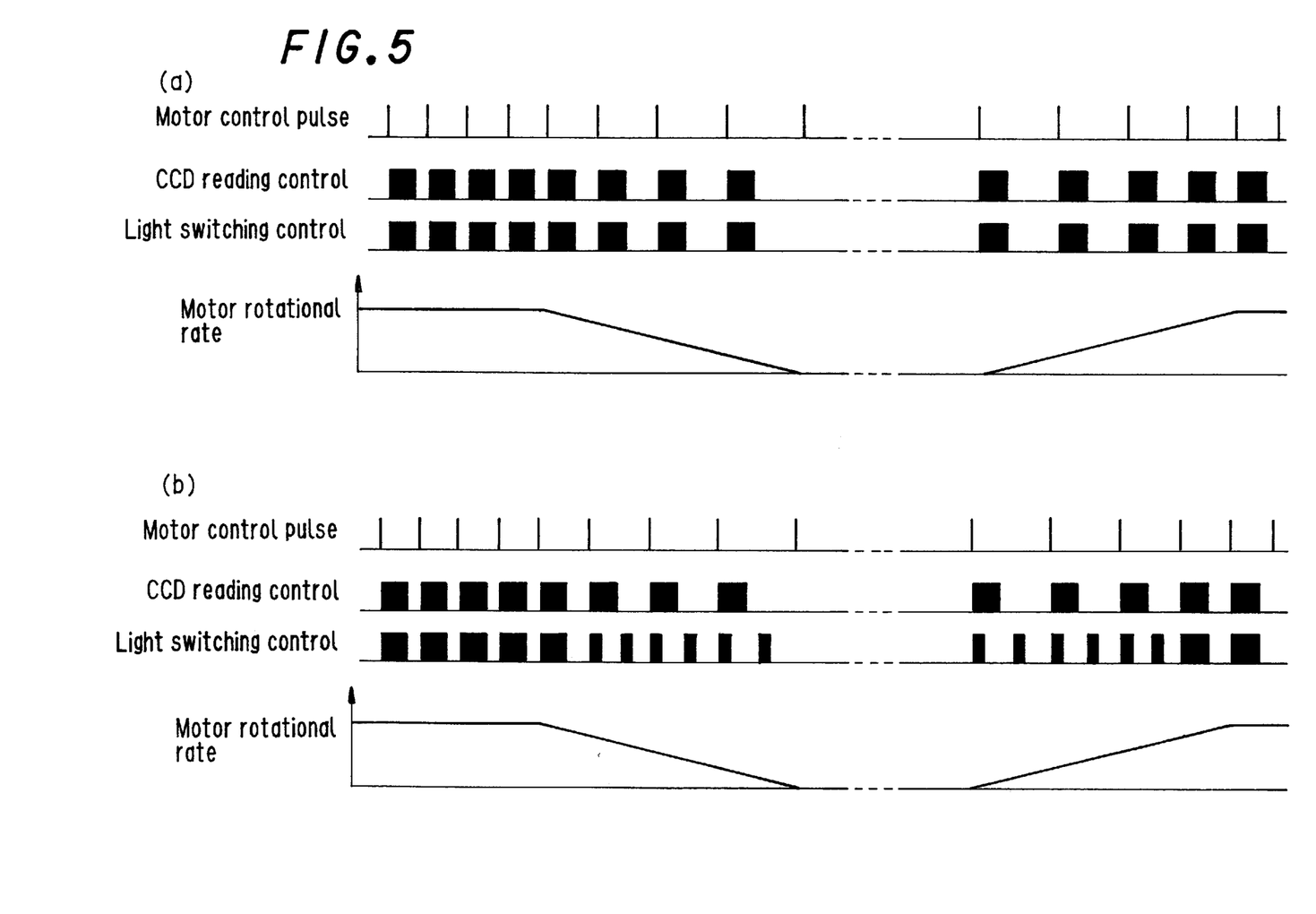
FIG. 5 is a chart showing the relationship between the control pulse train to the feed motor and the operation timings of the light source and the CCD.

FIG. 5 is a chart showing the relationship between the control pulse train CPU 11 gives to feed motor 25 and the operation timings of light source 21 and CCD 23. When the original is conveyed at the standard speed, CPU 11 issues control pulses at regular intervals to motor driving portion 26, so that rotational speed of the feed motor 25 is made constant. During this, the illumination of light source 21 and the reading by CCD 23 are controlled in synchronization with the control pulse signal. That is, CPU 11 activates light source 21 for a predetermined period of time at periodical intervals of the control pulse output. CPU 11 also causes CCD 23 to output at periodical intervals of the control pulse output.

When the speed of movement of the original is gradually retarded as stated above, the output period of the carrier pulse is gradually lengthened to retard the rotation of feed motor 25 whilst preventing feed motor 25 from getting out of step. Since the illumination of light source 21 and the reading by CCD 23 are controlled in synchronization with the control pulse signal, the illuminating period of light source 21 and the period of output from CCD 23 are also gradually lengthened. By these settings, it is possible to avoid the scanned intervals from being narrowed or widened with respect to the moving direction of the original. Therefore, it is possible to avoid redundant reading or skips in reading, achieving a markedly more excellent reading operation.

It should be noted that the illumination time of light source 21 and the output time of CCD 23 are set constant even when the output period of the carrier pulse is lengthened. This is because if the illumination time of light source 21 and the output time of CCD 23 are lengthened in conformity with the output period of the carrier pulse, the information from the original might be picked up in part, excessively compared to the mode in which the original is moved at the standard speed, giving rise to difficulty in keeping a uniform quality of image.

When the speed of movement of the original is gradually raised, the output period of the carrier pulse is gradually shortened to accelerate the rotation of feed motor 25. Since the illumination of light source 21 and the reading by CCD 23 are controlled in synchronization with the control pulse signal, the illumination period of light source 21 and the period of output from CCD 23 are also gradually shortened. Also in this case, the illumination time of light source 21 and the output time of CCD 23 are set constant even when the output period of the carrier pulse is shortened.

In the above description, although the time width of illumination of light source 21 and the time width of output from CCD 23 are set constant, it is also possible to control the system by breaking up the illumination time of light source 21 and making the total illumination time width become constant, as shown in chart(b) of FIG. 5.

(Second embodiment)

Figure 6:
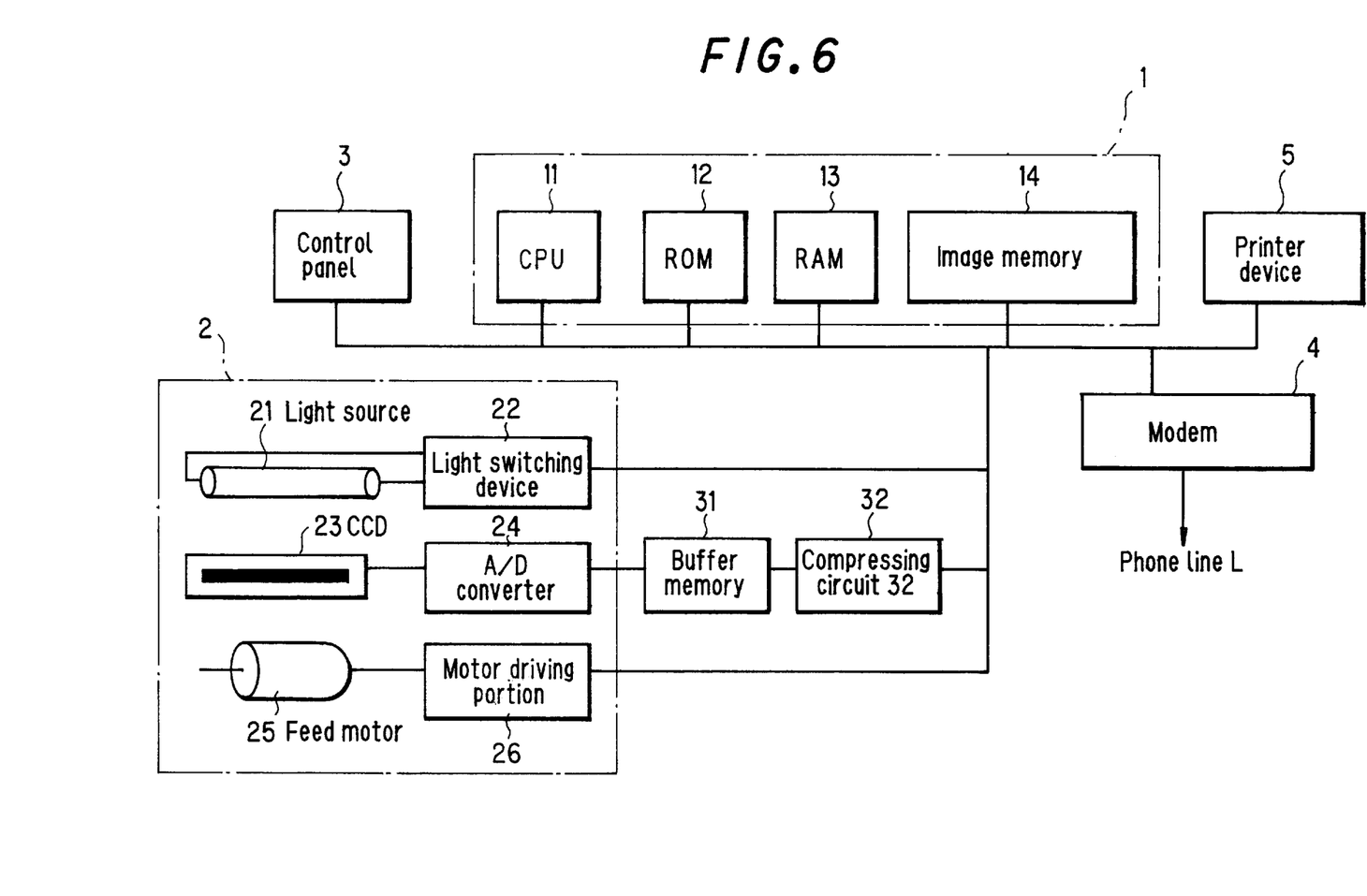
FIG. 6 is a block diagram showing the facsimile machine in accordance with the second embodiment of the invention.

FIG. 6 is a block diagram showing a facsimile machine to which an image reading apparatus in accordance with the second embodiment of the invention is applied. This facsimile machine has a so-called data compressing function, and this is featured in that a buffer memory 31 and a compressing circuit 32 for compressing the image information are interposed between controller 1 and A/D converter 24. Other configurations are the same as in the first embodiment.

In the above configuration, the image information picked up by image reading portion 2 is transmitted to compressing circuit 32 via buffer memory 31. The compression of the image information by compressing circuit 32 is based on, for example, the MH (Modified Huffman) scheme, the MR (Modified READ) scheme, the MMR (Modified Modified READ) scheme, or the like. The compressed data is transferred to memory 14 by use of, for example, an unillustrated DMA (Direct Memory Access) circuit provided for CPU 11.

In the above compressing schemes, the speed of compression varies depending on the form in which the image information was read. That is, in some cases, the speed of compression may become lower than the reading speed of the image. In this case, CPU 11 continuously detects the amount of data in buffer memory 31, and controls the movement of the original or movement of light source 21 and CCD 23 in accordance with the amount of data in the same manner as in the first embodiment. Accordingly, it is possible to eliminate the reading defects of the original which would occur when the movement of the original was stopped abruptly in the conventional art.

The present invention should not be limited to the above embodiments, and it is of course possible to add many modifications and changes to the above embodiments within the scope of the invention. For example, the control shown in the above embodiments can be applied to a scanner device which transmits the scanned image information to the computer by way of memory, a printer device which temporarily stores the print information into the memory, or other devices.

Further, if CPU 11 can recognize the transmission rate of image information onto phone line L, the aforementioned control of the movement of original in accordance with the amount of data in memory 14 can be made based on time, e.g., T1 to T4 shown in FIG. 4.

As has been apparent from the above description, in accordance with the invention, it is possible to gradually change the speed of movement of the original or the converting means in accordance with the amount of information in the storage means, not abruptly stopping the movement of the original as in the conventional art in order to temporarily stop the reading of the original. Therefore, it is possible to precisely read the original without degrading the quality of the image and without needing any extra time during the reading.

Further, since the first predetermined amount is set close to the maximum amount of data in the storage means while the second predetermined amount is set close to the minimum amount of data in the storage means, the storage capacity of the storage means can be used efficiently. Therefore, there is neither need to use a high capacity memory nor provide additional memory etc.

Moreover, since the operation timing of the converting means is controlled in accordance with the speed of movement of the original or the converting means, it is possible to avoid the intervals of reading from being narrowed or widened with respect to the moving direction of the original. Thus, it is possible to achieve excellent reading of the original.

What is claimed is:

1. An image reacting apparatus comprising:

converting means for reading information of an original and converting the read information into image information;

moving means for relatively moving the converting means to the original;

storage means for storing the image information;

output means for maintaining a regular and continuous output from said storage means; and controlling means for controlling the relative movement of the original to the converting means in accordance with the amount of data stored in the storage means;

wherein the controlling means detects the amount of data stored in the storage means, and gradually reduces the speed of relative movement between the original and the converting means when the amount of stored data exceeds a first predetermined amount, and gradually increases the speed of relative movement between the original and the converting means when the amount of stored data becomes equal to, or smaller than, a second predetermined amount, which is smaller than the first predetermined amount, such that said storage means never becomes totally empty between the initiation of the reading of said original by said converting means and the completion of the output of stored image information of said original from said storage means.

2. The image reading apparatus according to claim 1, wherein the controlling means stops the relative movement between the original and the converting means when the amount of data stored in the storage means reaches its maximum, or immediately before reaching its maximum.

3. The image reading apparatus according to claim 2, wherein the operation of the timing of the converting means is controlled in accordance with the relative speed of movement between the original and the converting means.

4. The image reading apparatus according to claim 1, wherein the operation timing of the converting means is controlled in accordance with the speed of relative movement between the original and the converting means.

* * * * *